UNITED STATES PATENT OFFICE.

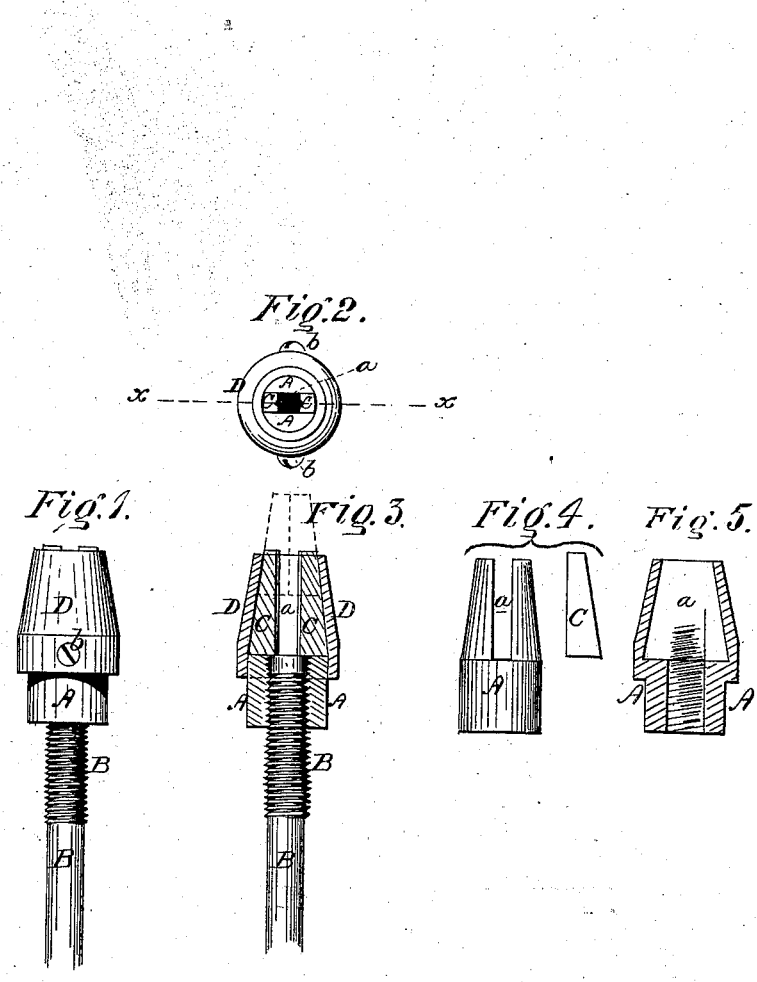

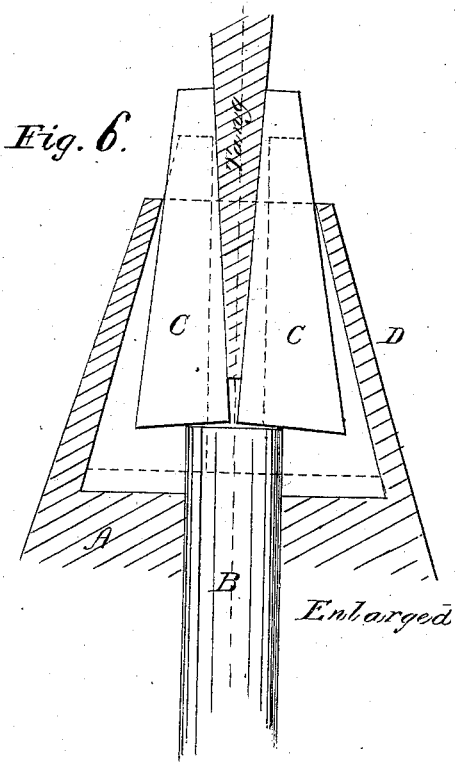

HENRY L. PRATT, OF BROOKLYN, NEW YORK.

IMPROVEMENT IN DRILL-CHUCKS.

Specification forming part of Letters Patent No. 194,109, dated August 14, 1877; application filed March 30, 1877.

*To all whom it may concern:*

Be it known that I, HENRY L. PRATT, of Brooklyn, Kings county, State of New York, have invented certain Improvements in Drill-Chucks, of which the following is a specification:

My invention relates to drill-chucks; and consists in a novel construction, combination, and arrangement of parts, and has for its objects to simplify the construction and improve the operation of such drill-chucks, as will be fully hereinafter set forth.

Figure 1 is a vertical elevation. Fig. 2 is an end view. Fig. 3 is a vertical section through line $x\ x$, Fig. 2. Fig. 4 includes two parts in detail. Fig. 5 shows a modification in construction of a part of the drill-chuck. Fig. 6 is a diagram.

A is the body of the chuck, the lower portion of which is cylindrical and the upper portion tapering or conical, and slotted longitudinally, as shown at $a$, Fig. 4. Through the center of the cylindrical portion is a tapped hole, which opens into the slot $a$, and into this hole the threaded end of the spindle B is screwed. C C are movable jaws, of the shape shown at Fig. 4, and of a thickness equal to the width of the slot in the body A, in which slot they are supported and move. D is a conical shell, which fits over the conical portion of the body A, and is rigidly secured thereon by the screws $b\ b$. This shell serves to close the sides of the slot in the body A; but instead of this construction, the slot may be cut directly into a solid piece of metal, as shown at Fig. 5, thus dispensing with the necessity of a separate shell. The jaws C C are perfectly loose in the slot $a$, in which they are confined by the shell D, and the width of their bases is such that, when spread apart to their widest extent, (which is limited by the width of the bottom of the slot $a$,) they will overhang the hole in the body A, and consequently, when the spindle B is screwed into the slot, it comes against the bottom of the jaws and forces them forward, and, as their inclined sides act against the interior of the shell D, they are closed and made to gripe on the shank of the drill placed between them.

By having the jaws perfectly loose and independent in their slots the chuck is enabled to hold a taper tang the apex of which would come within the shell D, as the jaws are free to adjust themselves to the inclined sides of the tang when it is forced in between them, as shown at Fig. 6. The tang having thus been inserted between the jaws, on advancing the screw-spindle pressure will be brought to bear against their outer edges by the mouth of the shell, and they will be clamped against the tang, holding it securely.

The screw on the end of the spindle B is right handed, and thus the operation of drilling has a tendency to tighten the jaws on the drill. This chuck is intended for use principally with hand or breast drills; but it may be generally employed for holding drills, &c.

I am aware of the Letters Patent granted to E. B. Beach, September 6, 1864, and those granted to C. E. Butler, April 19, 1870, and I disclaim the devices therein shown and described.

I claim—

The combination of the slotted body A and shell D, secured rigidly thereon, with the jaws C C, capable of free and independent movement in the slot $a$, and screw-threaded spindle B, which acts against the bases of the jaws, and closes them by forcing them forward and their inclined sides against the shell D, constructed and operating substantially as described and specified.

HENRY L. PRATT.

Witnesses:
E. P. STOUGHTON,
E. H. JOHNSON.